United States Patent [19]

Marx et al.

[11] 4,362,290

[45] Dec. 7, 1982

[54] MOLD FOR PLASTIC NEEDLEPOINT SHEET

[75] Inventors: Michael K. Marx, Pittsburgh; Louis P. Musante, Fairview, both of Pa.

[73] Assignee: Westminster Marketing, Inc., Pittsburgh, Pa.

[21] Appl. No.: 283,908

[22] Filed: Jul. 17, 1981

[51] Int. Cl.³ .......................... B27C 1/00; B29F 1/00
[52] U.S. Cl. ........................... 249/60; 249/67; 425/542
[58] Field of Search ............... 425/DIG. 42, 588, 542, 425/394, 395; 249/60, 68, 67

[56] References Cited

U.S. PATENT DOCUMENTS

| | | | |
|---|---|---|---|
| 1,405,998 | 2/1922 | Gammeter | 425/DIG. 42 |
| 1,597,961 | 8/1926 | Burt | 425/DIG. 42 |
| 1,748,626 | 2/1930 | Waner | 425/DIG. 42 |
| 2,218,612 | 10/1940 | Lockwood | 249/60 |
| 2,246,513 | 6/1941 | Hammond | 249/60 |
| 2,365,740 | 12/1944 | Winkel | 249/60 |
| 2,556,590 | 6/1951 | Long | 249/60 X |
| 2,913,767 | 11/1959 | Simon | 425/DIG. 42 |
| 3,026,569 | 3/1962 | Keller | 425/DIG. 42 |
| 4,006,879 | 2/1977 | Morroni | 249/68 |
| 4,050,666 | 9/1977 | Van Tichelt | 249/68 |

FOREIGN PATENT DOCUMENTS

| | | | |
|---|---|---|---|
| 53-12961 | 2/1978 | Japan | 425/588 |
| 54-11964 | 1/1979 | Japan | 425/588 |

*Primary Examiner*—J. Howard Flint, Jr.
*Attorney, Agent, or Firm*—Carothers and Carothers

[57] ABSTRACT

An injection mold for molding plastic needlepoint sheets which have a plurality of aligned rows of perforations which define plastic threads therebetween in a lattice configuration. The mold has engageable top and bottom mold body halves with open uniform mold channels formed in each half in a lattice configuration wherein the channel lattices of the mold halves cooperatively mate with each other upon engagement to define a mold cavity therebetween for the molding of a needlepoint sheet. The lattice channels in the mold body halves are constructed whereby the lattice channels in one half define a greater total volume than that of the other half, such that the greater volume of plastic to be molded in the mold cavity is received in the ejection half of the mold. In order to facilitate removal of the molded sheet from the mold, the lattice mold channels in the mold body halves are contoured to define a resultant cross section of the thread of a needlepoint sheet to be molded which is polygonal. In order to compensate for possible misalignment or offset of the mold halves during the molding operation, the cross-sectional opening width of the lattice mold channels in one mold half are greater than that of the other mold half to provide an intentional mating mismatch between the mold channel openings of the respective mold halves.

9 Claims, 4 Drawing Figures

MOLD FOR PLASTIC NEEDLEPOINT SHEET

BACKGROUND OF THE INVENTION

This invention relates generally to molds, and more particularly to a mold cavity structure for the molding of flexible needlepoint sheets used in the craft of needlepoint.

Needlepoint sheets of flexible plastic material which have a plurality of aligned rows of perforations which define plastic threads therebetween are commonly available on the market for those interested in the craft of needlepoint. Thread-like material such as yarn is sewn onto the sheets through the perforations in a desired pattern to form a resultant artistic work. Generally, the plastic threads of the needlepoint sheet which are defined between the perforations therethrough have a rounded cross-sectional configuration.

The difficulty lies in the molding of these plastics sheets with conventional injection mold techniques. Generally, the injection molds utilized have engageable top and bottom mold body halves with open uniform mold channels formed in each half in a lattice configuration wherein the channel lattices of the mold halves cooperatively mate with each other upon engagement of the mold halves to define a mold cavity therebetween for molding a needlepoint sheet of plastic material which is injected into the mold cavity. Many manufacturers of such plastic needlepoint sheets desire a round cross section for the plastic cross threads making up the sheets, as some needlepoint artists prefer this configuration. However, when molding such sheets, a number of critical and troublesome problems are encountered. When the mold halves are separated, portions of the molded sheet will stick to one mold body half or the other, instead of all of the molded sheet remaining seated in the ejection half of the mold which contains the ejection pins for ejecting the molded sheet from that side of the mold.

Also, when the ejection pins on the ejection side of the mold are activated to eject the molded sheets from the mold half, the molded sheet tends to cling to the mold and the ejection pins have a tendency to penetrate and thereby destroy the warm molded sheet instead of ejecting it from the mold channels.

A further problem is encountered in that very often the mold halves, and particularly after continued use and wear, will become slightly offset with each other or mismatched thereby creating undesirable mismatched offsets in the cross section of the threads of the resultant needlepoint sheet being molded, giving it a poor appearance and making the perforations smaller than desired.

It is a principal object of the present invention to provide a mold for molding needlepoint sheets of flexible plastic material which is devoid of the aforementioned disadvantages encountered in the molds of the prior art.

SUMMARY OF THE INVENTION

The mold of the present invention has engageable top and bottom mold body halves with open uniform mold channels formed in each half in a lattice configuration wherein the channel lattices of the mold halves cooperatively mate with each other upon engagement of halves to define a mold cavity therebetween for molding therein a resultant needlepoint sheet of flexible plastic material having a plurality of aligned rows of perforations with the perforations defining plastic threads therebetween. A principal improvement resides in the fact that the open lattice channels in the mold body halves are constructed whereby the lattice channels in one mold half define a greater total volume than that of the other mold half, such that the greater volume of plastic to be molded in the cavity is received in this aforesaid one mold half, which is the ejection half or side of the mold. This is to accordingly insure that when the mold halves are separated, the molded needlepoint sheet will properly adhere to the ejection side of the mold. The molded sheet is thereafter ejected through the use of ejection pins.

Another improvement provided by the mold of the present invention resides in the fact that the lattice mold channels in the mold body halves are contoured to define a resultant cross section of the threads of a needlepoint sheet to be molded in the cavity which is polygonal. Typically, the polygonal cross section of the thread would be ten sided. This provides an apparent rounded or circular cross section to the needlepoint sheet threads even though the surface of the threads is faceted. The faceted surface of the threads greatly facilitates in removal of the molded sheet from the mold. The round cross section threads of the needlepoint sheets of the prior art tend to adhere to the mold cavity and it has been discovered by making a faceted or angular surface that the molded sheet is more readily removed from the mold without tendency to adhere to the mold, which is a critical problem with a sheet such as a needlepoint sheet which is molded of very fine plastic threads. The angled faces of the thread insure that when the mold body halves are separated, the mold body half which does not contain the ejection pins will readily detach itself from the molded sheet, and when the ejection pins are activated on the ejection side of the mold, they will readily dislodge the molded sheets from the lattice channels of the ejection side of the mold without the ejection pins penetrating or otherwise deforming the molded sheet.

Yet another improvement of the mold of the present invention is accomplished by providing the cross-sectional opening width of the lattice mold channels in one mold half with a greater dimension than that of the other mold half to provide an intentional mating mismatch between the channel openings of the respective mold halves. Ejection mold body halves have a tendency to become misaligned or offset with each other upon engagement, particularly after long periods of use and wear. With conventional injection molds for needlepoint sheets, the result is that the supposedly round or circular threads of the sheet no longer have a round appearance, and mismatch offsets or steps appear in the needlepoint sheet threads, no matter which side the sheet is viewed from, thus providing an undesirable appearance which can also affect the overall beauty and appearance of the resultant needlepoint design sewn on the sheet and cause the perforations to be too small. With the intentional mismatch provided between the channel openings of the respective mold halves of the mold of the present invention, the occurrence of an actual mismatch between the two mold halves still provides a resultant needlepoint sheet wherein the mismatch is not apparent in the threads of the needlepoint sheet, at least from one side thereof, and the overall rounded appearance of the threads is thus not affected.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

DETAILED DESCRIPTION OF THE PREFERRED EMBODIMENTS

Figure 1:
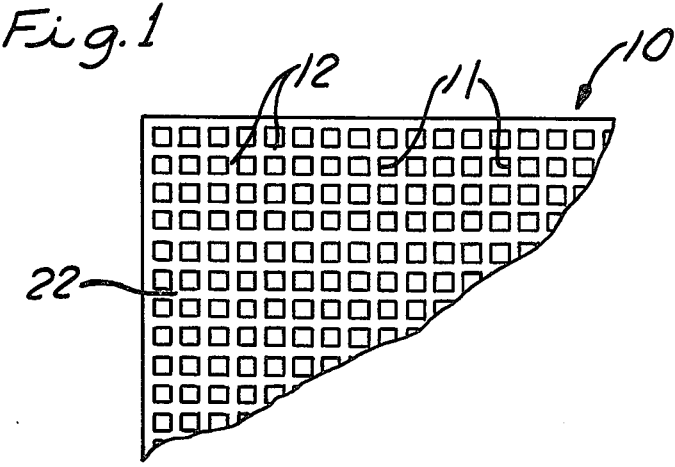
FIG. 1 is a plan view of a sectioned corner portion of a plastic needlepoint sheet molded in the mold of the present invention.

Referring to FIG. 1, a plastic needlepoint sheet 10 which has been molded with the mold of the present invention consists of a flexible plastic material having a plurality of aligned rows or perforations 11 therein which define plastic threads 12 therebetween. A thread-like material (not shown) such as yarn is sewn through the perforations in a selected pattern or design in order to sew a resultant needlepoint design onto the plastic sheet 10. The sheet 10 is molded of any suitable plastic such as polyethylene or polypropylene, and, of course, the plastic may be molded in any desired color.

Figure 2:
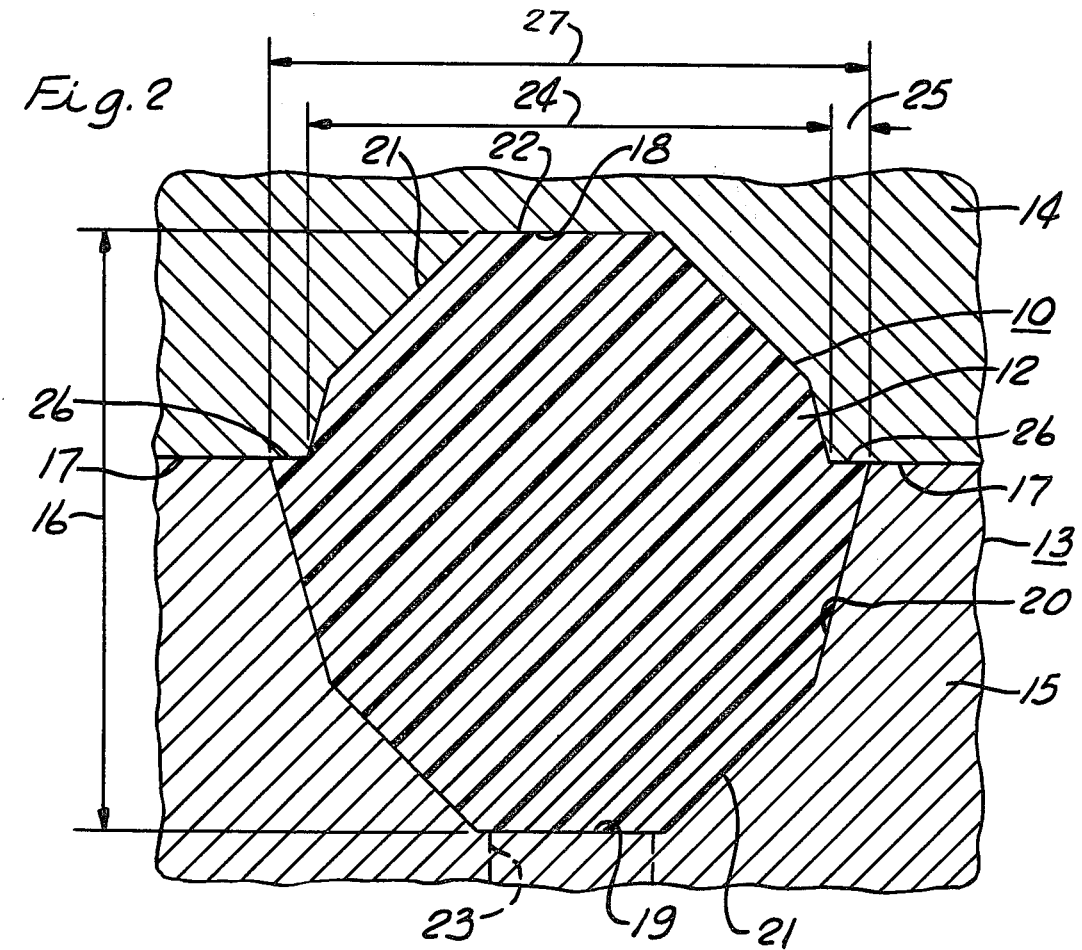
FIG. 2 is an enlarged cross-sectional view through one mold cavity channel of the present invention illustrating the mold of the present invention and the cross section of one thread of the needlepoint sheet illustrated in FIG. 1.

Referring to FIG. 2, an enlarged cross-sectioned portion of the mold 13 of the present invention is illustrated. The mold 13 is an injection mold and consists of engageable top and bottom mold body halves 14 and 15 respectively. This cross-sectional view is extremely enlarged and shows the cross section of one plastic thread 12 of the needlepoint sheet 10 illustrated in FIG. 1. This is a typical cross section through either a vertical or horizontal thread. To give an illustration as to the size of the enlargement of FIG. 2, the needlepoint sheet illustrated in FIG. 1 would typically be a 7 or 10 mesh screen and dimensions 27 and 16 of thread 12 illustrated in FIG. 2 might typically be 0.04 inches.

Mold body halves 14 and 15 are constructed of a suitable metal, and are, of course, separable at the mating flush face joint 17 for removal of the molded needlepoint sheet 10 therein.

The top mold body half 14 is provided with uniform mold channels 18 formed therein and the bottom body mold half, which is also the ejection mold half or side 15, is also provided with uniform mold channels 19. The mold channels 18 and 19 in their respective mold halves are configured in a lattice configuration wherein the channel lattices of the mold halves 14 and 15 cooperatively mate with each other upon engagement of the mold halves to define a mold cavity 20 therebetween for molding therein a resultant needlepoint sheet 10 of lattice configuration as illustrated in FIG. 1.

The lattice mold channels 18 and 19 in the mold body halves are constructed whereby the lattice channels 19 in the bottom or ejection half 15 of mold 13 define a greater total volume than do the lattice channels 18 formed in the top half 14 of mold 13, such that the greater volume of plastic to be molded in cavity 20 is received in lattice mold channels 19 or in the ejection side or half 15 of mold 13. This may be readily observed from the cross section of thread 12 in FIG. 2, in that the majority of the cross-sectional area of the thread lies below the separation space 17 of the mold body halves.

Due to the fact that the majority of the molded material is received in the bottom half 15 of the mold 13, when the mold halves 14 and 15 are separated at face 17, the molded needlepoint sheet 10 will stay with or adhere to the ejection side of the mold 15 while the upper half 14 of the mold body will readily separate itself from sheet 10. The separation of upper mold body half 14 from sheet 10 is further enhanced due to the polygonal cross-section configuration of thread 12 which provides ten facets or faces 21 about each thread 12. The combination of molding the majority of the material in the bottom mold half or ejection mold half 15 together with the angled spaces 21 on the upper surface 22 of sheet 10 permits the upper mold half 14 to be readily removed from the lower half 15 without the sheet 10 adhering to the upper half.

The lower or ejection half 15 of the mold 13 is provided with the conventional ejection pins 23 for ejecting the molded plastic needlepoint sheet 10 from the lattice mold channels 19 after the mold body halves have been separated.

Again, due to the angled faces 21 of the threads 12 in lattice mold channels 19, as opposed to the conventional cylindrical configuration, the molded sheet 10 is readily ejected from mold body half 15 without pins 23 penetrating or otherwise destroying the newly-molded sheet threads 12, for the same reasons as previously explained with regard to separation of the mold halves.

The polygonal cross section of threads 12 is here illustrated as ten sided. The use of this many faces permits one to use the teachings of the present invention of utilizing faceted faces as opposed to round surfaces for easy ejection from the mold, while at the same time, it still gives the thread 12 an overall round appearance. Note in this regard also, that even though most of the plastic of the thread 12 lies in the bottom lattice mold channels 19, nevertheless the overall appearance of the thread 12 still appears to be round or circular in view of the fact that dimension 27 and dimension 16 are identical.

Note also, that the cross-sectional opening width 27 of the lattice mold channels 19 in the lower mold half 15 are greater in dimension than the cross-sectional opening width 24 of the upper mold half 14 to provide an intentional mating mismatch 25 between the channel openings 27 and 24 of the respective mold halves. This provides an intentional mismatch on both sides of threads 12, which creates minute shoulders 26 on only the upper side 22 of sheet 10.

Figure 3:
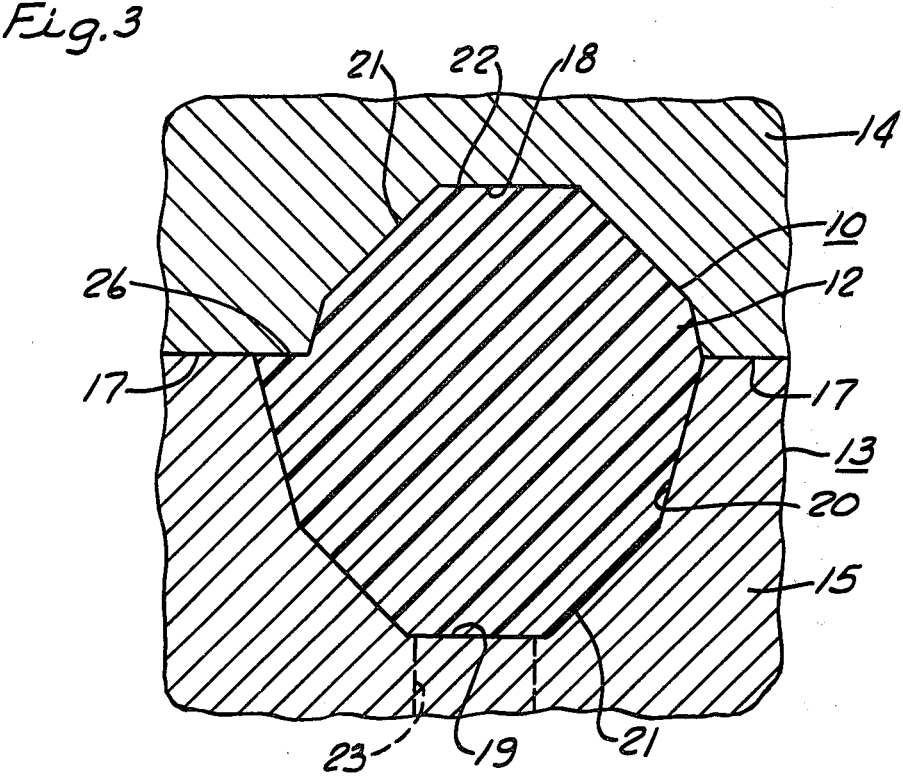
FIG. 3 is an enlarged cross-sectional view identical to that of FIG. 2, with the exception that the mold body halves of the mold of the present invention are illustrated in slight misalignment or mismatch with each other.

It is very common that injection molds such as mold 13, and particularly after long use and wear, the mold halves 14 and 15 occasionally become misaligned or mismatched. When this occurs, the cross-sectional configuration of FIG. 2 becomes that of FIG. 3. Since FIG. 3 is identical to FIG. 2 with the exception that the lattice channels 18 are misaligned with the lattice channels 19, all elements are designated with the same reference numerals.

Figure 4:
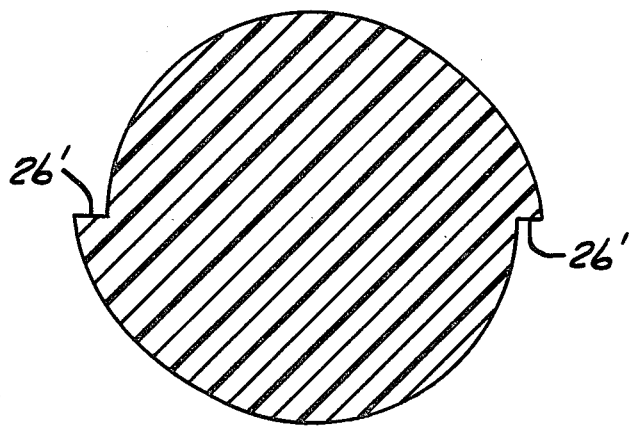
FIG. 4 is an enlarged cross-sectional view of a thread of a plastic needlepoint sheet of the prior art which was molded in a prior art mold which had mismatched or misaligned mold halves.

When misalignment occurred in injection molds of the prior art, the effect illustrated in FIG. 4 was obtained. Here, the mismatch offsets or shoulders 26' appear on both sides of the resultant needlepoint sheet. To the contrary, when mold mismatch occurs with the mold of the present invention, at least one useable side of the sheet 10 is still provided with no offset or mismatch steps being visible, thereby still providing a useable needlepoint sheet which has a pleasing appearance and no apparent discontinuities or non-uniformities on that one side, and the opening size of the perforations is not affected.

We claim:

1. In a mold having engageable top and bottom mold body halves with open uniform mold channels formed in each half in a lattice configuration wherein the channel lattices of the mold halves cooperatively mate with each other upon engagement of said mold halves to define a mold cavity therebetween for molding therein of a resultant needlepoint sheet of flexible plastic material having a plurality of aligned rows of perforations with said perforations defining plastic threads therebetween, the improvement comprising said open lattice channels in said mold body halves constructed whereby the lattice channels in one half define a greater total volume than that of the other half, such that the greater volume of plastic to be molded in said cavity is received in said one mold half.

2. The mold of claim 1, including ejection pin means in said one mold body half for ejecting a molded plastic needlepoint sheet from said lattice mold channels in said one mold body half after said mold body halves have been separated.

3. The mold of claim 1, wherein said lattice mold channels in said mold body halves are contoured to define a resultant cross section of the threads of a needlepoint sheet to be molded in said cavity which is polygonal.

4. The mold of claim 3, wherein said polygonal cross section is ten sided.

5. The mold of claim 1 or 3, wherein the cross-sectional opening width of the lattice mold channels in one mold half are greater than that of the other mold half to provide an intentional mating mismatch between the channel openings of the respective mold halves.

6. In a mold having engageable top and bottom mold body halves with open uniform mold channels formed in each half in a lattice configuration wherein the channel lattices of the mold halves cooperatively mate with each other upon engagement of said mold halves to define a mold cavity therebetween for molding therein of a resultant needlepoint sheet of flexible plastic material having a plurality of aligned rows of perforations with said perforations defining plastic threads therebetween, the improvement comprising said lattice mold channels in said mold body halves contoured to define a resultant cross section of the threads of a needlepoint sheet to be molded in said cavity which is polygonal.

7. The mold of claim 6, wherein said polygonal cross section is ten sided.

8. The mold of claim 6 or 7, wherein the cross-sectional opening width of the lattice mold channels in one mold half are greater than that of the other mold half to provide an intentional mating mismatch between the channel openings of the respective mold halves.

9. In a mold having engageable top and bottom mold body halves with open uniform mold channels formed in each half in a lattice configuration wherein the channel lattices of the mold halves cooperatively mate with each other upon engagement of said mold halves to define a mold cavity therebetween for molding therein of a resultant needlepoint sheet of flexible plastic material having a plurality of aligned rows of perforations with said perforations defining plastic threads therebetween, the improvement comprising the cross-sectional opening width of the lattice mold channels in one mold half are greater than that of the other mold half to provide an intentional mating mismatch between the channel openings of the respective mold halves.

* * * * *